No. 639,253. Patented Dec. 19, 1899.
W. A. LAPP.
THILL COUPLING.
(Application filed May 8, 1899.)
(No Model.)
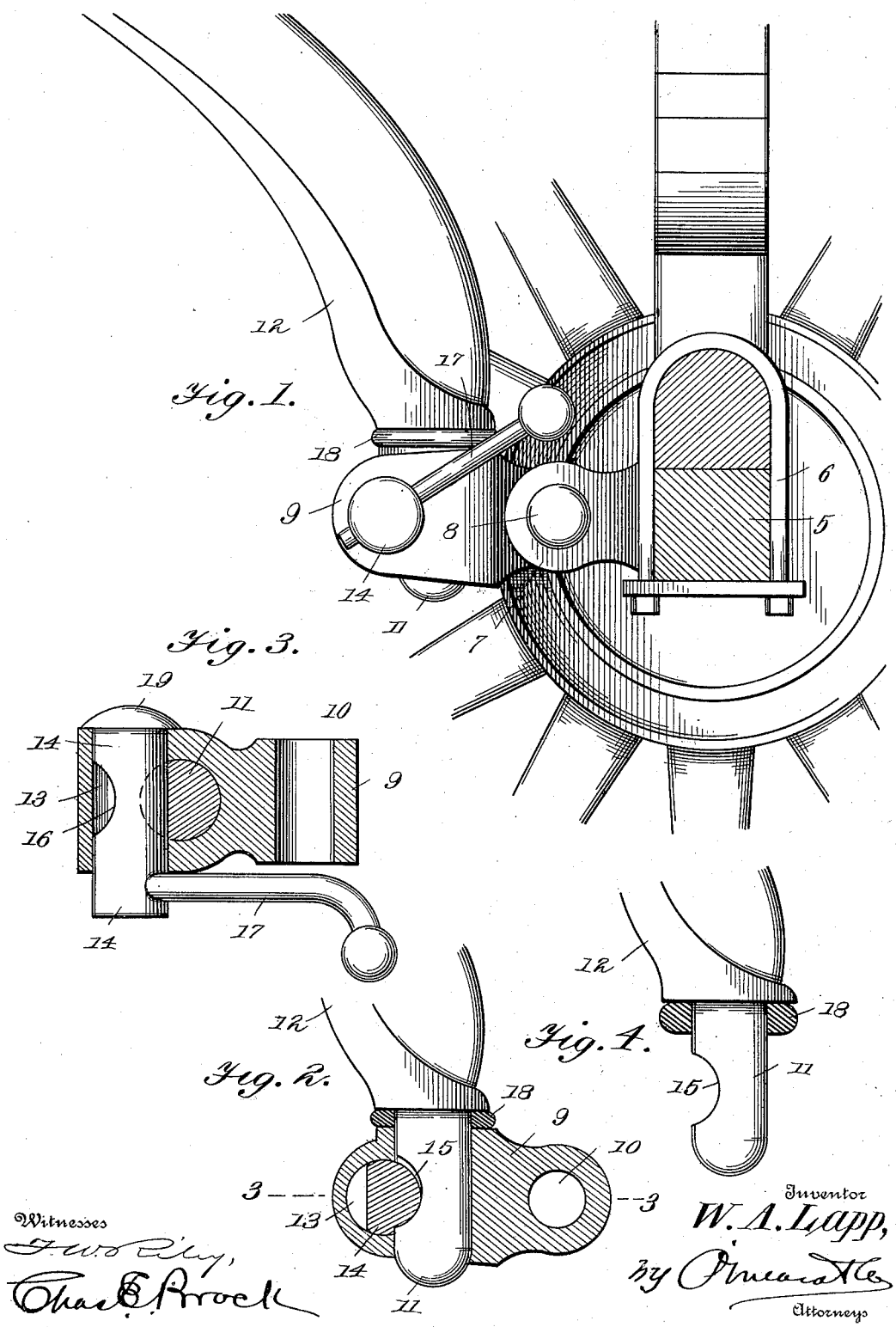
Witnesses
Inventor
W. A. Lapp,
Attorneys

UNITED STATES PATENT OFFICE.

WILLIAM A. LAPP, OF STEPHENTOWN, NEW YORK.

THILL-COUPLING.

SPECIFICATION forming part of Letters Patent No. 639,253, dated December 19, 1899.

Application filed May 8, 1899. Serial No. 716,045. (No model.)

*To all whom it may concern:*

Be it known that I, WILLIAM A. LAPP, a citizen of the United States, residing at Stephentown, in the county of Rensselaer and State of New York, have invented a new and useful Thill-Coupling, of which the following is a specification.

This invention relates to couplings for attaching thills and poles to the axles of vehicles, and has for its object to provide a simple, cheap, neat, and effective coupling for such purposes which may be quickly and easily operated and will prevent rattling or accidental displacement of the thills or pole.

With this object in view my invention consists in the improved construction, arrangement, and combination of parts hereinafter fully described and afterward specifically pointed out in the appended claim.

In order to enable others skilled in the art to which my invention most nearly appertains to make and use the same, I will now proceed to describe its construction and operation, reference being had to the accompanying drawings, forming part hereof, in which—

Figure 1 is a view in side elevation, illustrating my invention in use. Fig. 2 is a detail vertical sectional view of the coupling-iron and the shifting bolt therein, showing the thill-iron lock therein. Fig. 3 is a detail horizontal sectional view of the coupling-iron with the shifting bolt locked therein on the dotted line 3 3 of Fig. 2. Fig. 4 is a detail view, in side elevation, of the thill-iron, its pin, and the rubber cushion-ring.

Like numerals of reference mark the same parts wherever they occur in the various figures of the drawings.

Referring to the drawings by numerals, 5 indicates the axle of a vehicle, upon which is secured the ordinary clip 6, having forward-projecting lugs or ears 7, having openings to receive the ordinary bolt 8, which pivotally secures therein a coupling-iron 9. This coupling-iron is provided with a horizontal bore 10, through which the bolt 8 is passed, a vertical bore in front of the horizontal bore 10 to receive a pin 11, projecting downward from the thill or pole iron 12, and a second horizontal bore 13 in front of and cutting into the side of the vertical bore to receive the locking-bolt 14.

The pin 11 is provided with a curved notch 15 in its front side, which when the bolt 14 is locked receives one side of said bolt. The bolt 14 is provided with a similar notch 16, the walls of which coincide with the walls of the vertical bore in the coupling-block when the parts are in position to receive the thill-iron pin 11.

To attach the thills or pole to the coupling-iron 9, the locking-bolt 14 is rotated by means of its handle 17 until the walls of notch 16 are in line with the walls of the vertical bore. A rubber ring 18 having been placed on pin 11, the pin is placed in the vertical bore and the locking-bolt is turned to the position shown in Figs. 1, 2, and 3, in which its unnotched side rests in notch 15 of pin 11, and it is tightly held from turning therein by the elastic pressure of the rubber ring. The rubber ring thus acts as a spring to create sufficient friction to prevent the accidental turning of the lock-bolt, as well as an antirattler and as a packing to keep the joint free from dust or moisture.

The locking-bolt 14 is permanently secured in the coupling-iron, being prevented from slipping out of bore 13 by a head 19 on one side of the coupling-iron and the handle 17 on the other.

From the foregoing it will be seen that to shift from a single to a double team it is only necessary to turn the locking-pin a half-rotation, lift out the pin 11 of the thills, set in the pin 11 of the pole, and turn the handle a half-rotation back to position. This might be called a "lightning change," and the device is so simple in construction that it can be cheaply constructed and will not be liable to breakage or undue wear from ordinary use.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

In a thill-coupling, the combination with the axle and a clip having forwardly-projecting lugs, of the coupling-iron pivotally secured between said lugs, the thill-iron pin inserted in a vertical bore in the coupling-iron and having a curved groove in its side, the rubber ring between the coupling-iron and the thill-iron, and the locking-bolt having side groove, journaled in the coupling-iron at right angles to the grooved pin and adapted to engage in its groove substantially as described.

WILLIAM A. LAPP.

Witnesses:
WILLIAM L. CRANSTON,
JOHN W. BROWN.